(12) United States Patent
Tian et al.

(10) Patent No.: US 11,971,827 B2
(45) Date of Patent: Apr. 30, 2024

(54) METHODS, SYSTEMS, ARTICLES OF MANUFACTURE AND APPARATUS TO CONTROL ADDRESS SPACE ISOLATION IN A VIRTUAL MACHINE

(71) Applicant: Intel Corporation, Santa Clara, CA (US)

(72) Inventors: Jun Tian, Beijing (CN); Kun Tian, Shanghai (CN); Yu Zhang, Beijing (CN)

(73) Assignee: Intel Corporation, Santa Clara, CA (US)

(*) Notice: Subject to any disclaimer, the term of this patent is extended or adjusted under 35 U.S.C. 154(b) by 284 days.

(21) Appl. No.: 17/438,852

(22) PCT Filed: Jun. 21, 2019

(86) PCT No.: PCT/CN2019/092324
§ 371 (c)(1),
(2) Date: Sep. 13, 2021

(87) PCT Pub. No.: WO2020/252779
PCT Pub. Date: Dec. 24, 2020

(65) Prior Publication Data
US 2022/0100675 A1    Mar. 31, 2022

(51) Int. Cl.
*G06F 12/1009* (2016.01)
*G06F 9/455* (2018.01)
(Continued)

(52) U.S. Cl.
CPC ...... *G06F 12/1009* (2013.01); *G06F 9/45558* (2013.01); *G06F 9/4812* (2013.01);
(Continued)

(58) Field of Classification Search
CPC ............. G06F 12/1009; G06F 9/45558; G06F 9/4812; G06F 12/109; G06F 2009/45583; G06F 2212/657
(Continued)

(56) References Cited

U.S. PATENT DOCUMENTS

2016/0306749 A1   10/2016   Tsirkin et al.
2016/0378678 A1   12/2016   Lemay et al.
(Continued)

FOREIGN PATENT DOCUMENTS

| CN | 102754086 | 10/2012 |
|---|---|---|
| CN | 105487837 | 4/2016 |
| CN | 107844266 | 3/2018 |

OTHER PUBLICATIONS

International Searching Authority, "International Preliminary Report on Patentability," issued in connection with International Application No. PCT/CN2019/092324, dated Dec. 21, 2021, 4 pages.
(Continued)

*Primary Examiner* — Arpan P. Savla
*Assistant Examiner* — Sidney Li
(74) *Attorney, Agent, or Firm* — Hanley, Flight & Zimmerman, LLC

(57) ABSTRACT

Methods, apparatus, systems and articles of manufacture to control address space isolation in a virtual machine are disclosed. An example apparatus includes an address width adjustor to identify a memory width value corresponding to a guest memory associated with a virtual machine (VM), and generate an expanded emulated memory width value. The example apparatus also includes a memory mirror manager to generate a first guest physical address (GPA) range based on the memory width value, and generate a second GPA range based on the expanded emulated memory width value. The example apparatus also includes an EPT generator to
(Continued)

generate root paging structures of a first type of EPT with respective addresses within the first GPA range, and generate root paging structures of a second type of EPT with respective addresses within (a) the first GPA range and (b) the second GPA range.

25 Claims, 9 Drawing Sheets

(51) Int. Cl.
  *G06F 9/48* (2006.01)
  *G06F 12/109* (2016.01)
(52) U.S. Cl.
  CPC .. *G06F 12/109* (2013.01); *G06F 2009/45583* (2013.01); *G06F 2212/657* (2013.01)
(58) Field of Classification Search
  USPC .......................................................... 711/202
  See application file for complete search history.

(56) References Cited

U.S. PATENT DOCUMENTS

| | | | |
|---|---|---|---|
| 2017/0249261 A1 | 8/2017 | Durham et al. | |
| 2018/0136867 A1* | 5/2018 | Tsirkin | G06F 9/45558 |
| 2019/0266000 A1* | 8/2019 | Tsirkin | G06F 9/45558 |

OTHER PUBLICATIONS

Intellectual Property India, "Examination Report," issued in connection with Indian Patent Application No. 202147042311, dated Jan. 30, 2023, 5 pages.

Hua, Z., et al., "EPTI: Efficient Defence against Meltdown attack for Unpatched VMs," included in the Proceedings of the 2018 USENIX Annual Technical Conference (USENIX ATC '18), Jul. 11-13, 2018, Boston, MA, USA, 13 pages.

Belay, A., "Virtualization," acquired from the Internet on Feb. 21, 2019 via https://pdos.csail.mit.edu/6.828/2017/lec/l-vmware.pdf, 39 pages.

Chase, J., "Soul of a New Machine," downloaded from the Internet on Feb. 21, 2019 via https://users.cs.duke.edu/~chase/cps510/slides/dune-background.pptx, 69 pages.

Masters, J., "Understanding L1 Terminal Fault aka Foreshadow: What you need to know," downloaded from the Internet on Feb. 13, 2019, 10 pages.

Bhatia, N., "Performance Evaluation of Intel EPT Hardware Assist," retrieved from https://www.vmware.com/pdf/Perf_ESX_Intel-EPT-eval.pdf, 14 pages.

Zhao, S., "On the Effectiveness of Virtualization Based Memory Isolation on Multicore Platforms," downloaded from the Internet on Feb. 21, 2019 at http://www.mysmu.edu/faculty/xhding/publications/fimce-eurosp17.pdf, 15 pages.

Redhat, "L1TF-L1 Terminal Fault Attack—CVE-2018-3620 & CVE-2018-3646," retrieved from https://access.redhat.com, Aug. 14, 2018, 9 pages.

Wikipedia, "Kernel page-table isolation," retrieved from https://en.wikipedia.org/wiki/Kernel_page-table_isolation, last edited on May 27, 2018, 5 pages.

Sallam, A., et al., "4th Generation Intel® Core™ vPro™ Processors with Intel® VMCS Shadowing," White Paper, downloaded on Mar. 13, 2019, 8 pages.

Snoeren, A., "Lecture 17: Virtual Machines," CSE 120, University of California San Diego, Computer Science & Engineering, 7 pages.

International Searching Authority, "International Search Report," mailed in connection with International Patent Application No. PCT/CN2019/092324, dated Mar. 24, 2020, 4 pages.

International Searching Authority, "Written Opinion," mailed in connection with International Patent Application No. PCT/CN2019/092324, dated Mar. 24, 2020, 4 pages.

* cited by examiner

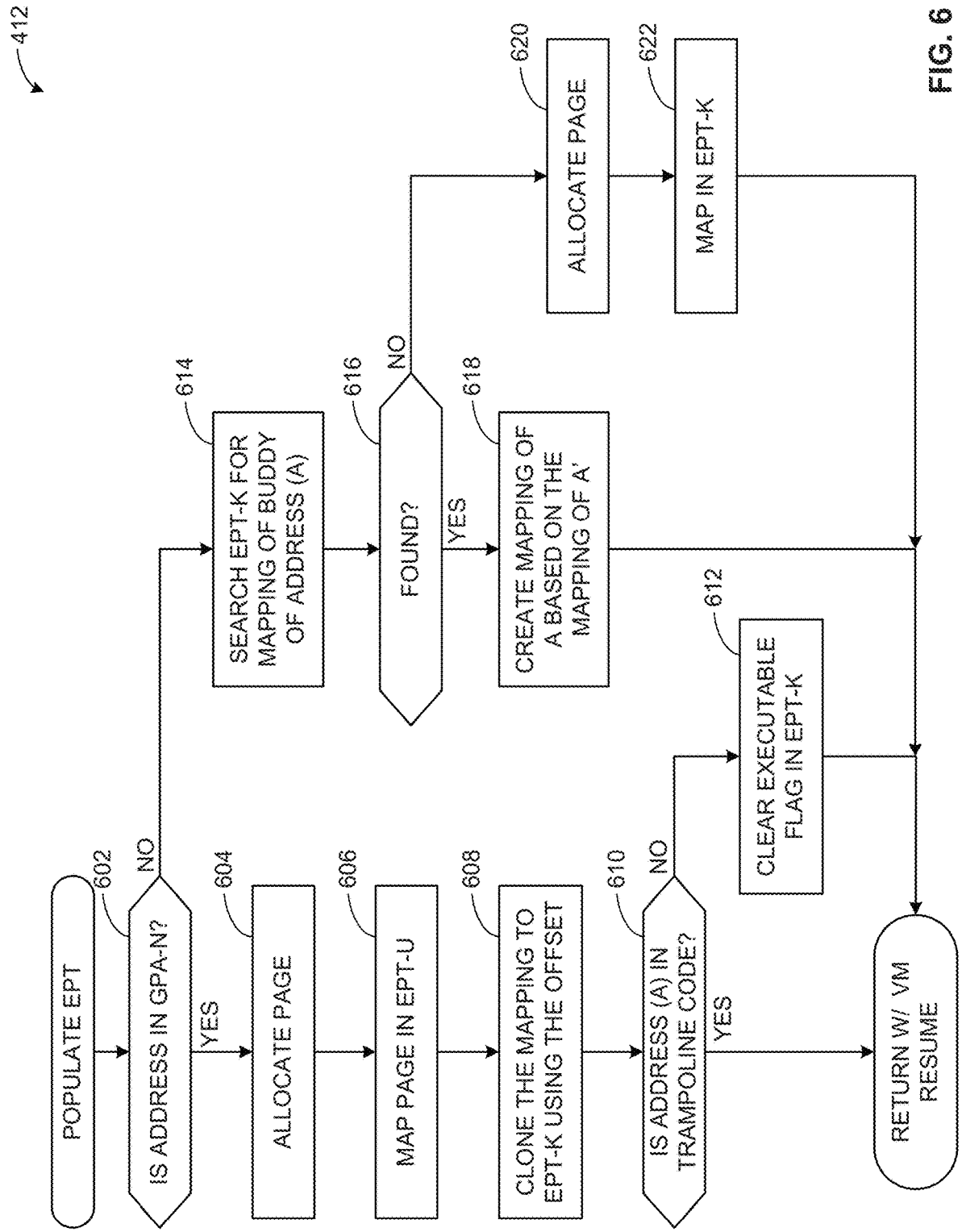

METHODS, SYSTEMS, ARTICLES OF MANUFACTURE AND APPARATUS TO CONTROL ADDRESS SPACE ISOLATION IN A VIRTUAL MACHINE

FIELD OF THE DISCLOSURE

This disclosure relates generally to processors, and, more particularly, to methods, systems, articles of manufacture and apparatus to control address space isolation in a virtual machine.

BACKGROUND

Processor operation includes a user mode for program operations, such as storage and/or retrieval of information from memory. However, processor operation also includes a kernel mode for system tasks having a relatively higher degree of sensitivity and/or risk in the event such kernel mode address information were revealed to a non-authorized entity.

BRIEF DESCRIPTION OF THE DRAWINGS

FIGS. 4-6, 7A and 7B are flowcharts representative of example machine readable instructions which may be executed to implement the example platform of FIG. 1, the example mapping of FIG. 3, the example address space isolator of FIGS. 1 and/or 2A, and/or the example context switch engine of FIGS. 1 and/or 2B to control address space isolation in a virtual machine.

The figures are not to scale. In general, the same reference numbers will be used throughout the drawing(s) and accompanying written description to refer to the same or like parts.

Figure 1:
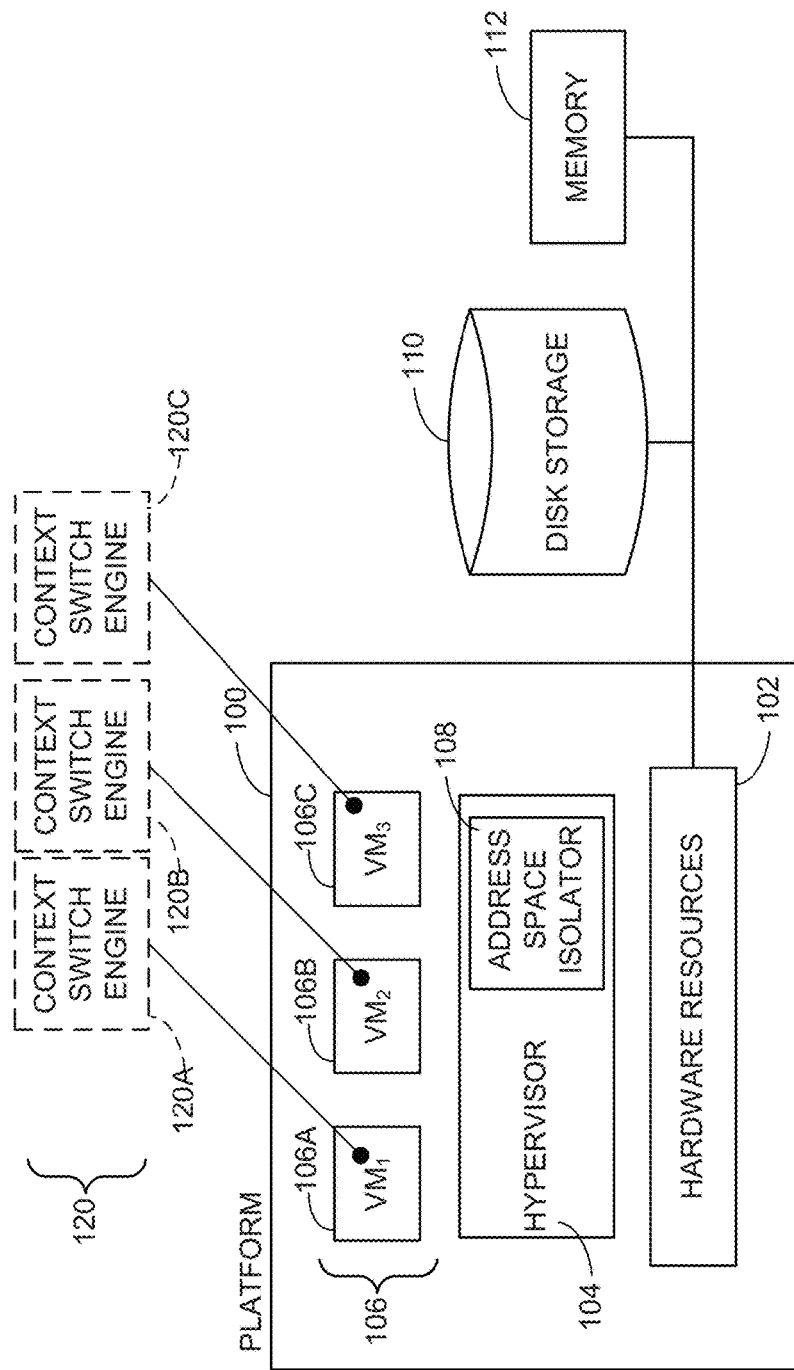
FIG. 1 is a schematic illustration of an example platform including an example address space isolator and an example context switch engine to control address space isolation in a virtual machine in a manner consistent with teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, hackers have attempted exploits on processors with increased frequency. Most modern operating systems (OSs) (e.g., Linux) share user address space and kernel address space in a single page table for each running process on a platform. A page table, as used herein, is defined to be a data structure used with and/or by a virtual memory system to store any number of address mappings between virtual addresses and physical addresses. Access to the user address space and/or the kernel address space relies on hardware memory management units (MMUs) to enforce proper permission control so that user mode instructions cannot access kernel sensitive data by using kernel-mode virtual addresses (VAs).

Malware known as Meltdown and Spectre have breached an isolation boundary between user space and kernel space of processor activity, thus exposing a potential vulnerability. Such vulnerabilities may allow unauthorized processes to read data of privileged kernel or other processes, which is particularly dangerous to platforms (e.g., cloud platforms) that support virtual machines (VMs). The Meltdown malware discovered in January of 2018 permits malicious user applications to steal contents of kernel memory.

In response to such threats, non-trivial and resource-hungry patches have been implemented to offer separate page tables for user mode and kernel mode. One example patch is kernel page table isolation (KPTI). When applied to a platform, KPTI stops kernel memory leakages from rogue user processes by separating page tables for user mode and kernel mode. Efforts to fully hide kernel address space are an effective countermeasure against rogue applications, particularly when the processor (e.g., a central processing unit (CPU)) is running in a relatively lower privilege mode (e.g., user mode). However, KPTI patching efforts require system rebooting and are typically only effective on recent versions of operating system (OS) kernels. Furthermore, because KPTI requires two separate guest page tables (one page table for the kernel mode, and another page table for the user mode), the kernel mode table provides full-view of both user and kernel space mappings (to maintain protection against possible rogue applications seeking kernel control and/or modification) for each process, platform/system resource consumption grows considerably (e.g., a memory footprint increase). Such resource consumption causes performance degradation of the platform/system. However, performance degradation is caused by, in part, translation lookaside buffer (TLB) flushing that occurs during mode switches from user mode to kernel mode (and vice-versa). Additionally, at least some problems with KPTI include a need to increase a memory footprint, and a resulting performance degradation caused by the resource consumption growth. In some examples, KPTI has been observed to exhibit a performance degradation of up to 30%, and a corresponding downgrade can be from 7% to 17% when process context identifiers (PCID) are enabled.

While separate page tables for the user and kernel mode of each process are necessary for address space isolation on a native operating system (OS), this requirement is not indispensable in a VM. In connection with extended page tables (EPTs) underneath that perform further layer(s) of address translation from the guest physical address into host physical addresses, address space isolation in the VM can be achieved alternatively by switching the EPT on the host. To improve upon the observed inefficiencies of KPTI techniques for user/kernel space isolation, other known techniques create two EPTs for every VM that is instantiated. This approach is referred to herein as EPT isolation (EPTI). Instead of using two guest page tables (gPTs) for each process inside a VM as in KPTI, EPTI uses two separate EPT tables for the whole VM. Similar to KPTI, EPTI offers EPT switching during context switching between guest user mode and kernel mode. That is, a first type of EPT is a kernel EPT (EPTk) that corresponds to the relatively higher-privileged kernel, and a second type of EPT is a user EPT (EPTu) that corresponds to the relatively lower-privileged user mode. The guest kernel and user mode still share one gPT, but in the user mode the guest paging structures used for kernel address space are remapped to zeroed pages in EPTu, which forbids any translation of address within kernel space to mitigate attacks (e.g., the Meltdown attack). Additionally, because EPT switching does not invoke TLB flushing operation(s) (unlike gPT switching), EPTI results in a more efficient manner of mode isolation when compared to KPTI.

However, while EPTI achieves resource utilization benefits when compared to KPTI, EPTI still requires substantial remapping for guest table pages (e.g., to remap guest L3 page table page address to a zeroed page for guest kernel mode). Such remapping involves substantial tracking (and write-protection) to know the addresses of guest page tables (e.g., L3 page tables) during respective table life-cycles. Excessive VM exits may occur when attempting to obtain addresses of guest L3 page tables, which require the tracking of L4 page tables, and therefore further tracking of guest CR3 modifications (e.g., a guest CR3 register). Such tracking is known to be error prone and to consume significant platform resources.

Examples disclosed herein control address space isolation to reduce computational and/or resource burdens on a platform on which a VM is enlightened. As used herein, "enlightened" refers to communicating functional capabilities of a first entity (e.g., a hypervisor (HV)) to a second entity (e.g., a VM), such that those functional capabilities may be later utilized (e.g., during runtime). Generally speaking, examples disclosed herein invoke address space mirroring to allow guest virtual address (VA) to be applied to corresponding guest physical address (GPA) ranges that correspond to either (a) user mode or (b) kernel mode. This permits EPT mapping toggle activity without corresponding guest table tracking complexities and associated resource inefficiencies associated therewith.

As described in further detail below, examples disclosed herein generate two GPA ranges, a first GPA range referred-to as GPA-N (normal guest physical address associated with user mode privileges), and a second GPA range referred-to as GPA-M (mirrored guest physical address associated with kernel mode privileges). GPA-N refers to an existing guest physical address range that is dedicated to guest user VA mappings, and GPA-M refers to a mirrored guest physical address range that are translated by EPT into the same host physical memory as mapped by GPA-N, but is dedicated for guest kernel VA mapping.

FIG. 1 is a schematic illustration of an example platform 100 to control address space isolation in a VM. In the illustrated example of FIG. 1, the platform 100 includes hardware resources 102, a hypervisor 104 and virtual machines (VMs) 106. In particular, the example VMs 106 include an example first VM 106A, an example second VM 106B and an example third VM 106C. While the illustrated example of FIG. 1 includes three VMs, examples disclosed herein are not limited thereto. Additionally, each of the VMs 106A, 106B, 106C includes a corresponding context switch engine 120A, 120B, 120C. In particular, the example first VM 106A includes an example first context switch engine 120A, the example second VM 106B includes an example second context switch engine 120B, and the example third VM 106C includes an example third context switch engine 120C. The example hypervisor 104 and the VMs 106 of the example platform 100 execute on and/or otherwise utilize the example hardware resources 102. The example hardware resources 102 include, but are not limited to processors, memory, input/output (I/O), graphics engine(s) and/or chipsets. In the illustrated example of FIG. 1, the hardware resources include example disk storage 110 and example memory 112. The disk storage 110 may be implanted by any type of mass storage device, such as a hard disk drive, or a solid-state drive. The memory 112 may be implemented by non-volatile memory, or volatile memory, such as Synchronous Dynamic Random Access Memory (SDRAM), Dynamic Random Access Memory (DRAM), etc.

The example hypervisor 104 of this example manages allocation of the example hardware resources 102 of the platform 100 to one or more of the example VMs 106. In particular, the example hypervisor 104 resides in a host OS (installed on the platform 100) to facilitate, distribute and/or otherwise manage virtual hardware resources to respective ones of the VMs 106 in a manner that makes each VM perceive that it has access to the (actual) hardware resources 102. However, the VMs 106 do not have access to the example hardware resources 102. Instead, guest operating systems of the respective VMs 106 interact with virtual hardware resources facilitated by the hypervisor 104, but each of the VMs 106A, 106B, 106C of FIG. 1 operates in complete logical isolation to one another.

The illustrated example of FIG. 1 also includes an example address space isolator 108. While the example address space isolator 108 is shown in the illustrated example of FIG. 1 as part of the example hypervisor 104, examples disclosed herein are not limited thereto. In some examples, the address space isolator 108 may reside and/or otherwise operate in an alternate location of the platform 100. The example address space isolator 108 implements address mapping control, as described in further detail below.

Figure 2A:
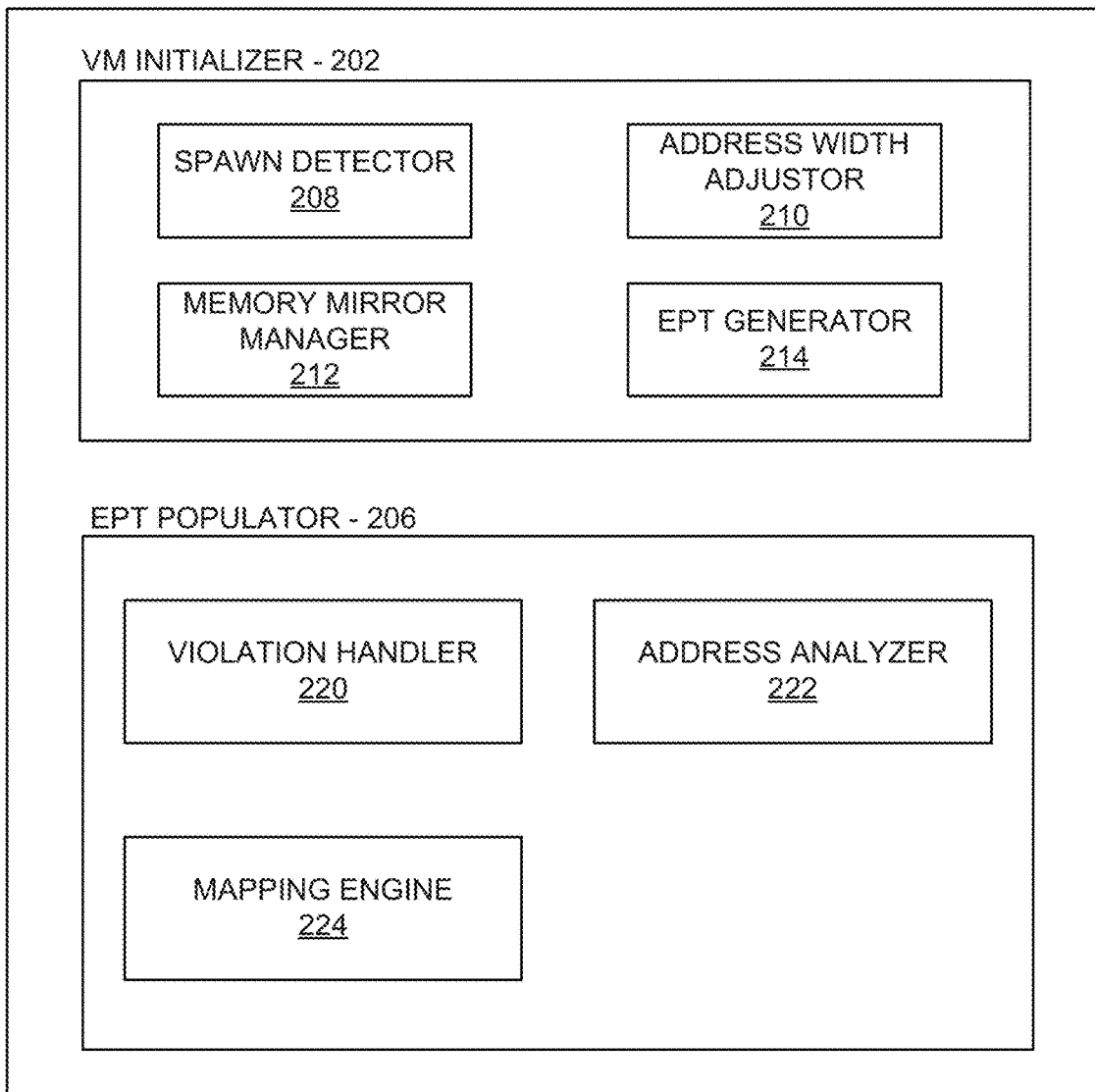
FIG. 2A is an illustration of an example implementation of the address space isolator of FIG. 1.

FIG. 2A illustrates an example implementation of the example address space isolator 108 of FIG. 1. In the illustrated example of FIG. 2A, the address space isolator 108 includes an example VM initializer 202, and an example EPT populator 206. The example VM initializer 202 includes an example spawn detector 208, an example address width adjustor 210, an example memory mirror manager 212, and an example EPT generator 214. The example EPT populator 206 includes an example violation handler 220, an example address analyzer 222, and an example mapping engine 224.

In this example, the VM initializer 202 implements means for initializing a VM. The VM initializing means is implemented in this example by a processor executing instructions, such as those represented by blocks 404 and 514 of FIGS. 4 and 5, respectively. However, the means for initializing a VM may additionally or alternatively be implemented by a VM initializing means.

In this example, the EPT populator 206 implements means for EPT populating. The EPT populating means is implemented in this example by a processor executing instructions, such as those represented by blocks 412 and 612 of FIGS. 4 and 6, respectively. However, the means for EPT populating may additionally or alternatively be implemented by an EPT populating means.

In this example, the spawn detector 208 implements means for spawn detecting. The spawn detecting means is implemented in this example by a processor executing instructions, such as those represented by blocks 402 and/or 412 of FIG. 4. However, the means for spawn detecting may additionally or alternatively be implemented by a spawn detecting means.

In this example, the address width adjustor 210 implements means for address width adjusting. The address width adjusting means is implemented in this example by a processor executing instructions, such as those represented by blocks 502 and/or 504 of FIG. 5. However, the means for address width adjusting may additionally or alternatively be implemented by an address width adjusting means.

In this example, the memory mirror manager 212 implements means for memory mirroring. The memory mirroring means is implemented in this example by a processor executing instructions, such as those represented by block 506 of FIG. 5. However, the means for memory mirroring may additionally or alternatively be implemented by a memory mirroring means.

In this example, the EPT generator 214 implements means for EPT generation. The EPT generation means is implemented in this example by a processor executing instructions, such as those represented by blocks 508 and/or 512 of FIG. 5. However, the means for EPT generation may additionally or alternatively be implemented by an EPT generation means.

In this example, the trampoline code manager 216 implements means for managing trampoline code. The managing trampoline code means is implemented in this example by a processor executing instructions, such as those represented by blocks 514 and/or 610 of FIGS. 5 and 6, respectively. However, the means for managing trampoline code may additionally or alternatively be implemented by a managing trampoline code means.

In this example, the EPT focus adjustor 218 implements means for EPT focus adjusting. The EPT focus adjusting means is implemented in this example by a processor executing instructions, such as those represented by blocks 510 and/or 512 of FIG. 5. However, the means for EPT focus adjusting may additionally or alternatively be implemented by an EPT focus adjusting means.

In this example, the violation handler 220 implements means for violation handling. The violation handling means is implemented in this example by a processor executing instructions, such as those represented by block 410 of FIG. 4. However, the means for violation handling may additionally or alternatively be implemented by a violation handling means.

In this example, the address analyzer 222 implements means for address analyzing. The address analyzing means is implemented in this example by a processor executing instructions, such as those represented by block 602 of FIG. 6. However, the means for address analyzing may additionally or alternatively be implemented by an address analyzing means.

In this example, the mapping engine 224 implements means for mapping. The mapping means is implemented in this example by a processor executing instructions, such as those represented by blocks 514, 604, 608, 614, 616, 618, 620 and/or 622 of FIGS. 5 and 6, respectively. However, the means for mapping may additionally or alternatively be implemented by a mapping means.

Figure 2B:
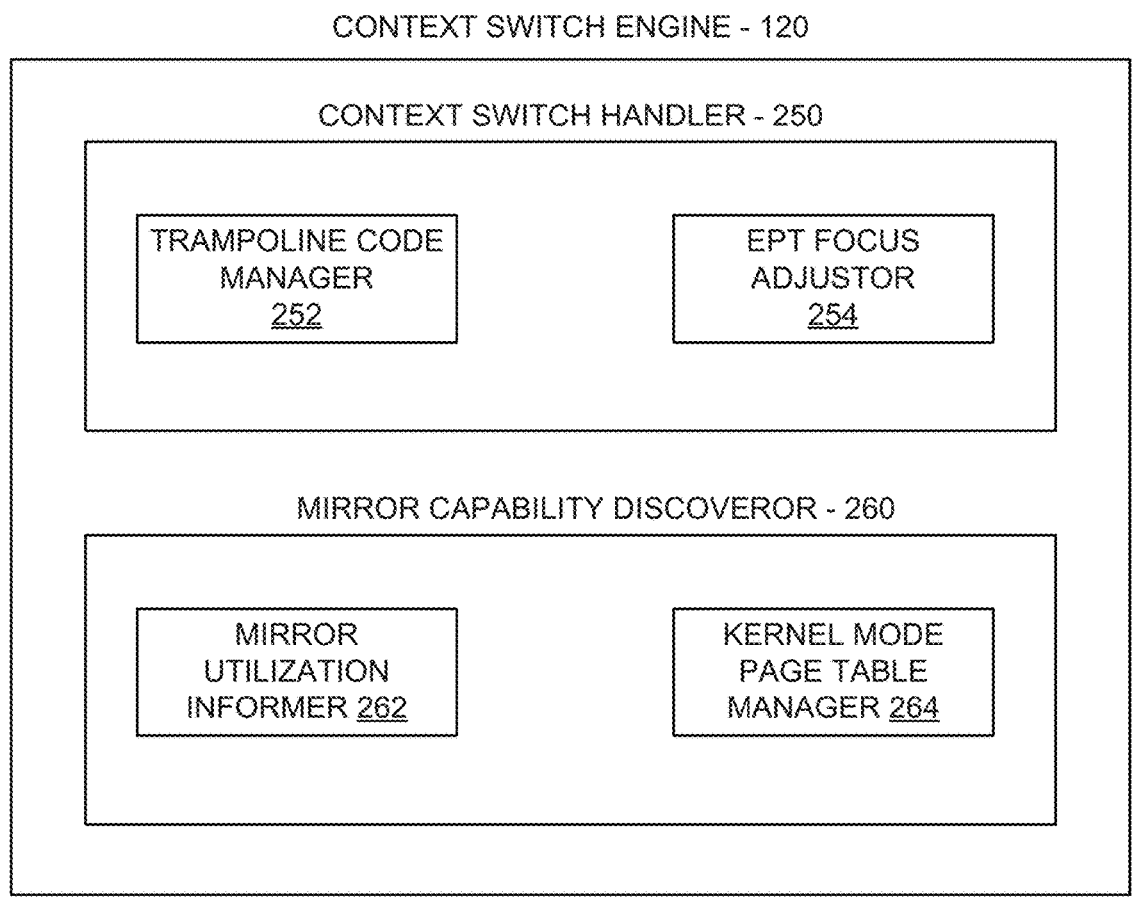
FIG. 2B is an illustration of an example implementation of the context switch engine of FIG. 1.
Figure 3:
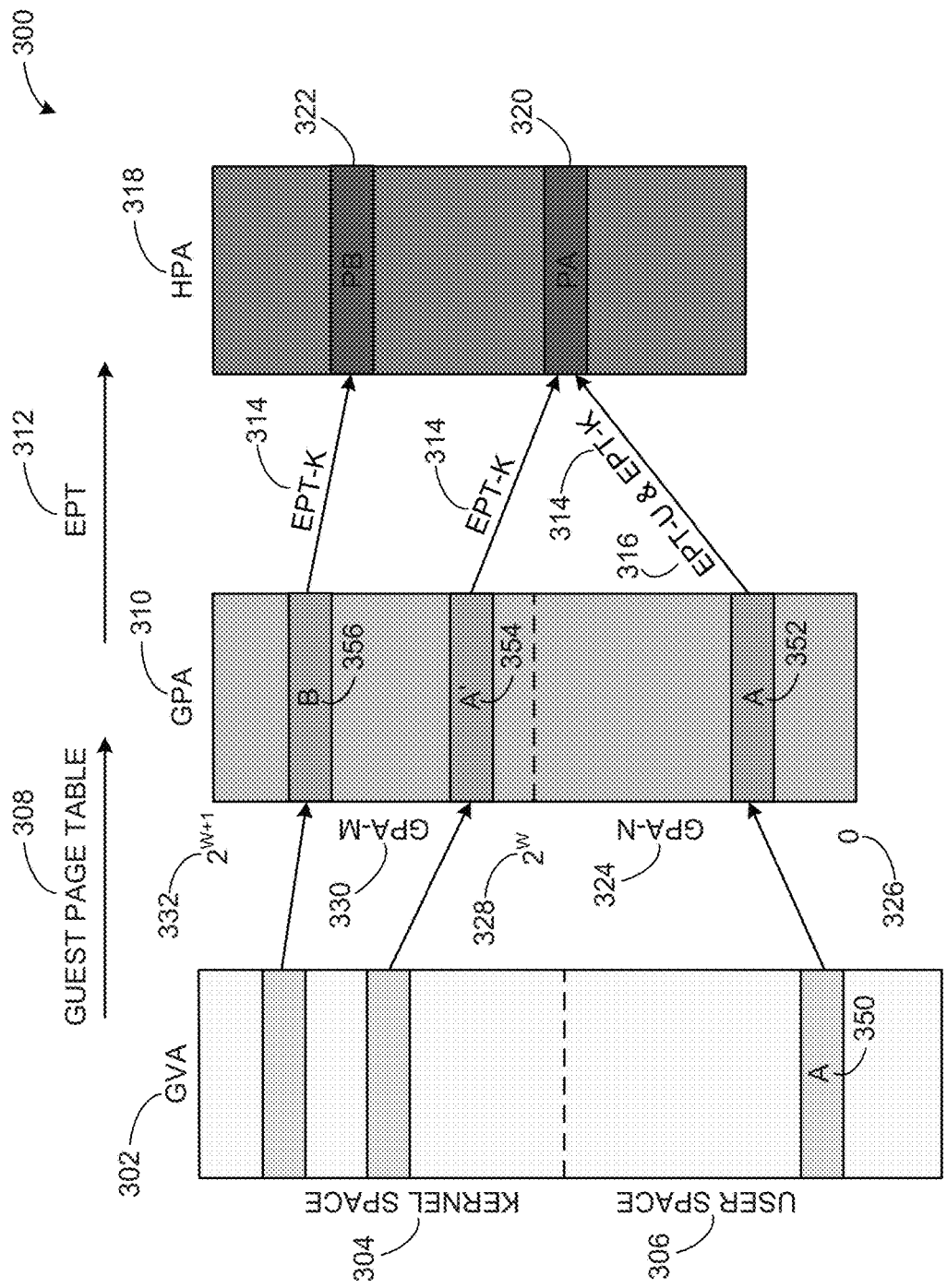
FIG. 3 illustrates an example page table mapping.

FIG. 3 illustrates an example page table mapping topology 300 to control address space isolation. Generally speaking, the example page table mapping topology 300 of FIG. 3 will be occasionally referred to when discussing the structure of FIGS. 1, 2A and/or 2B. The example address mapping topology 300 of FIG. 3 is controlled by the example address space isolator 108 of FIGS. 1, 2A and 2B to control address space isolation. In the illustrated example of FIG. 3, example guest virtual address (GVA) space 302 includes example kernel space 304 and example user space 306. During execution of a process, the process accesses a guest virtual address (gVA) to be translated into a guest physical address by an example guest page table 308 (e.g., a data structure or group of data structures generated by the example VM 106 and stored in the example memory 112). The guest page table is represented in FIG. 3 by an arrow 308. The example guest page table 308 uses the page number to identify a corresponding frame number in example guest physical addresses (GPAs) 310. In some examples, the GPAs 310 correspond and/or otherwise refer to guest physical memory.

The illustrated example of FIG. 3 also includes an extended page table (EPT) 312 (e.g., a data structure generated by the example hypervisor 104 and stored in the example memory 112) that, as described in further detail below, is generated and divided into a kernel-EPT (EPT-K) 314 and a user-EPT (EPT-U) 316. In the example of FIG. 3, the EPT is represented by an arrow 312, the EPT-K is represented by an arrow 314, and the EPT-U is represented by an arrow 316. The EPT 312 (and corresponding EPT-K 314 and EPT-U 316) are data structures that may be stored on, for example, the memory 112 of the example platform 100. The example EPT 312 translates guest frame numbers into corresponding physical frame numbers of example host physical address (HPA) space 318 containing any number of host physical addresses. In some examples, the HPA space 318 is memory, such as the example memory 112 of FIG. 1. In the illustrated example of FIG. 3, the HPA space 318 includes a first physical address (PA) 320 and a second physical address (PB) 322. For instance, the first PA 320 has been translated from a guest virtual address A 350 by the guest page table 308 and the EPT 312.

Returning to the illustrated example of FIG. 2A, in operation the example address space isolator 108 manages and/or otherwise handles tasks related to VM initialization and EPT populating. For example, and as described in further detail below, the address space isolator 108 facilitates address splitting and exposes such split address capabilities to guest kernels of any number of VMs that might be instantiated in the future. In response to the example spawn detector 208 identifying and/or otherwise detecting that a VM spawn request (e.g., a request to instantiate a VM) has occurred on the example platform 100, the example address width adjustor 210 identifies a physical address width value (w) corresponding to a physical address width of guest memory (e.g., a memory width value). When a VM is initialized, associated configuration parameters accompany the VM initialization request to define how much memory a guest will have, how long (wide) its physical address is, etc. For example, if the physical address width value (w) is 30 bits, then this value is emulated by the example hypervisor 104 during VM operation. However, the example physical address width value (w) is not necessarily indicative of actual physical memory consumption, as the width values are emulated by the hypervisor 104, and not necessarily dependent on the hardware. As such, a requesting VM (e.g., the first example VM 106A) can be provided a particular memory width value and/or configuration to satisfy its computing objective without constraint imposed by actual physical memory resources of the example hardware resources 102.

Continuing with the example physical address width value (w) of 30 bits for purposes of illustration and not limitation, the guest physical address range will reside between zero and 1 gigabyte (GB) ($2^w=2^{30}$). As part of the effort to avoid the aforementioned resource intensive page table duplication efforts imposed by known KPTI techniques and/or the resource intensive and error prone page table tracking imposed by known EPTI techniques, the example address width adjustor 210 increases an emulated physical address width by a number of bits (e.g., one (1) bit). As such, in view of the original physical address width value (w) of 30 bits, the example address width adjustor 210 increases the width value to an expanded width value w+N (e.g., w+1 (e.g., 31 bits)). In effect, the example address width adjustor 210 creates an expanded emulated memory width value in which GPA values now span from zero (0) to $2^{w+1}$ ($2^{w+1}=2^{31}$) which is 2 GBs. Again, because the example width value (w) and expanded width value (w+1) are emulated by the example hypervisor 104, actual physical memory resource addition and/or pairity is not required by examples disclosed herein.

The example memory mirror manager 212 mirrors the guest memory to generate the first GPA range (GPA-N—normal) and the second GPA range (GPA-M—mirrored). In particular, the example memory mirror manager 212 generates GPA-N with an address width between zero (0) and w, and generates GPA-M with an address width between w and w+1. Briefly turning to the illustrated example of FIG. 3, the GPAs 310 include GPA-N 324 that spans between address zero 326 and address $2^w$ 328. Additionally, the GPAs 310 include GPA-M 330 that spans between address $2^w$ 328 and address $2^{w+1}$ 332.

The example EPT generator 214 generates the example EPT 312 and further divides the EPT 312 into EPT-K 314 and EPT-U 316 (e.g., a data structure (EPT 312) with sub structures (EPT-K 314 and EPT-U 316)). The example EPT generator 214 configures and/or otherwise structures EPT-U 316 with mappings only in connection with GPA-N 324. In particular, EPT-U 316 mappings are constrained to GPA-N 324 to maintain security from a user mode that might otherwise attempt unauthorized access to kernel address space. Additionally, the example EPT generator 214 configures and/or otherwise structures EPT-K 314 with mappings in connection with GPA-N 324 and GPA-M 330. Because EPT-K 314 is more privileged, a guest kernel mode will be able to access memory with guest virtual addresses, whenever necessary. However, the reciprocal is not permitted, such that no guest kernel virtual address will be able to be used by a user mode.

The example VM initializer 202 enables a VM to switch between addresses of EPT-K 314 and EPT-U 316 with a virtualization instruction after addresses have been mirrored and the EPTs have been split. In some examples, the virtualization instruction has a particular invocation structure associated with a respective processor manufacturer, such as vmfunc for Intel®-based processors. However, other virtualization instructions and invocation procedures may be considered in connection with examples disclosed herein. The example vmfunc instruction permits VMs running in non-root mode to trigger VM functions without causing a VM-Exit. The example VM initializer 202 enlightens corresponding VMs that the vmfunc instruction can be invoked by the corresponding VM to facilitate loading of EPT pointers (EPTP) to establish control of the newly established hierarchy of EPT-K 314 and EPT-U 316. In some examples, a virtual machine control structure (VMCS) includes particular configuration fields that can be set to identify EPTP switching capabilities and particular EPTs targeted. Stated differently, this hierarchy facilitates a simplicity of creating two separate EPTs for a VM rather than the relatively more-burdensome creation of two separate guest page tables for each process within the VM, as is required in known KPTI. In some examples, the aforementioned processor configuration fields (e.g., in the VMCS) are configured to enable EPT focus functionality, such as with a virtual machine control structure (VMCS®) stored in the example hypervisor 104, but examples disclosed herein are not limited thereto.

Typically when a VM is created and/or otherwise instantiated, there will be no mapping in its corresponding EPT. In other words, the EPT is empty. As such, when the VM accesses a virtual address when operating in user mode or kernel mode, the VM is seeking a corresponding physical memory location (e.g., the data stored in PA 320 or PB 322 of the example HPA space 318) to accomplish some memory access task (e.g., memory read, memory write, etc.). However, in the event the mapping does not exist (e.g., no mapping from the guest physical address, from which the guest virtual address maps to), the example violation handler 220 detects an EPT violation.

The example address analyzer 222 determines if the address (e.g., the requesting address (GPA) from a VM) is associated with GPA-N (e.g., user mode related addresses) or GPA-M (kernel mode related addresses). In the event the VM is using a user mode related address, then the example mapping engine 224 allocates a page and establishes a mapping in the EPT-U. For the sake of discussion, assume that the guest virtual address (GVA) provided by the VM is referred to as address (A) 350, as shown in the illustrated example of FIG. 3. The guest kernel maps address (A) to GPA-N of EPT-U (see reference number 352) because it is associated with the user mode (e.g., not privileged for kernel address space access). The example mapping engine 224 maps address (A) of GPA-N to physical address (PA) 320. The example address analyzer 222 determines and/or otherwise analyzes whether the GPA falls within GPA-N or GPA-M prior to the example mapping engine 224 creating mappings in EPT-U or EPT-K. Additionally, because possible future kernel mode VM activity may also require access to this user space address, the example mapping engine 224 or, in some examples, the guest kernel clones the address (A) to GPA-M of EPT-K to a buddy address (A') (A-prime) (see reference number 354). Stated differently, anything mapped in EPT-U must be cloned in EPT-K for possible kernel mode availability. In particular, the example mapping engine 224 calculates and applies an offset between the address (A) 352 and the buddy address (A') 354 as [A'=A|GPA_MIRROR_BIT], in which the GPA_MIRROR_BIT is the additional bit added via $2^{w+1}$. As also shown in the illustrated example of FIG. 3, the mapping engine 224 facilitates common mapping to physical address (A), referred to as (PA) 320, based on the offset. This allows future kernel mode access to the same physical address in the host physical memory as would be accessed by a user mode request.

If the address (A) 352 is in the associated trampoline code, as determined by the example address analyzer 222, then the example hypervisor 104 calls VMRESUME and continues to monitor for instances of additional/alternate VM instantiation requests and EPT violations. However, in the event the address (A) 352 is not in the trampoline code, then the EPT populator 206 clears an executable flag in EPT-K. Generally speaking, the example trampoline code is called to switch the EPT during guest user or kernel mode switching occurrences and is mapped in both EPT-K and EPT-U. However, after entry of the kernel mode and before the EPT is switched, the guest is still using addresses within GPA-N. Similarly, after the EPT is switched from EPT-K to EPT-U (but prior to returning to the user mode), there is a piece of code that runs in kernel mode, but uses EPT-U. In the event a process successfully switched the EPT to EPT-K in user mode, then it would be able to initiate attacks, which is a circumstance to be prevented. To prevent such attacks, the executability of all addresses that fall in GPA-N in EPT-K is disabled. As such, even a malicious guest process that switches the EPT to EPT-K can perform nothing except trigger a non-executable EPT violation after the switch.

In other examples, if the example address analyzer 222 determines that the address from the VM corresponds to the kernel mode, then the example mapping engine 224 searches EPT-K for a mapping of the buddy (A') of address (A). In other words, a prior EPT violation may have already created an appropriate mapping for the kernel mode for address (A') that also has user mode privileges, but those user mode privilege mappings may not yet have been created. If so, then the example mapping engine 224 creates a mapping of address (A) 352 based on that previous mapping of (A') 354 using the offset (in the opposite direction as described above). This facilitates a mapping of (A') 354 to (PA) 320. On the other hand, in the event that the mapping engine 224 does not find a prior mapping of a buddy address in EPT-K, then the buddy might not yet be access by the user mode. In that case, mappings of A 352 are created in EPT-K. In the event that the buddy is later accessed in guest user mode, then a mapping is established in the EPT violation handler at a later time. The example mapping engine 224 allocates a page (e.g., a guest table page 308) and maps to address (B) 356 in GPA-M of EPT-K because it is associated with the kernel mode. This particular EPT mapping corresponds to the second physical address (PB) 322, as shown in the illustrated example of FIG. 3. Generally speaking, the address analyzer determines whether the GPA falls within GPA-N or GPA-M. The mapping engine allocates memory for the GPA and establishes corresponding mappings. Furthermore, to establish the mappings, the mapping engine typically queries the mapping status of the buddy address and clones the mapping relationship for the buddy into EPT-K when appropriate.

FIG. 2B illustrates an example implementation of the example context switch engine 120 of FIG. 1. In the illustrated example of FIG. 2B, the context switch engine 120 includes an example context switch handler 250 and an example mirror capability discoverer 260. Generally speaking, the example context switch engine 120 resides in a kernel of an instantiated VM spawned by the example hypervisor 104. The context switch engine 120 is enlightened to address mirroring capabilities to control address space isolation and VM context switching without substantial tracking burdens, error and/or VMExit requirements of traditional address isolation techniques.

The example context switch handler 250 of FIG. 2B includes an example trampoline code manager 252 and an example EPT focus adjustor 254. Additionally, the example mirror capability discoverer 260 of FIG. 2B includes an example mirror utilization informer 262 and an example kernel mode page table manager 264. In operation, the example mirror capability discoverer 260 is invoked in response to creation of a VM by the example hypervisor 104. In particular, an instantiated VM initially has no awareness of possible mirroring capabilities of the example hypervisor until the example mirror capability discoverer 260 invokes a discovery query. In some examples, the discovery query invoked by the example mirror capability discoverer 260 includes a CPUid command or a model specific register (MSR) command. The example mirror utilization informer 262 monitors for a response to the discovery query and if an affirmative response for mirroring capabilities is received and/or otherwise retrieved, the example mirror utilization informer 262 informs the hypervisor 104 and/or the example address space isolator 108 that the mirroring capabilities will be used during address mapping operations. Additionally, the example kernel mode page table manager 264 establishes page tables for kernel mode operations of the VM. However, in the event the discovery query does not indicate mirroring capabilities are available to the recently instantiated VM, then the mirror utilization informer 262 does not forward and/or otherwise send an acknowledgement that mirroring capabilities will be used, which allows the example VM to operate in a traditional manner.

During runtime of the example VM (e.g., the example first VM ($VM_1$) 106A), the example context switch handler 250 is structured to operate in the entry/exit point of a system call handler or an interrupt exception handler. In effect, the example context switch handler 250 monitors and/or is otherwise responsive to occurrences of a kernel system call or interrupt of the VM. In response to such an occurrence, the example trampoline code manager 252 performs a context switch from user mode to kernel mode using lightweight trampoline code. For example, during runtime a process in a VM (e.g., $VM_1$ 106A) may trigger a system call to perform a task (e.g., an I/O task), or a hardware interrupt may occur, or an exception may be generated. Such occurrences may be handled by a guest kernel. The example context switch handler 250 is responsive to (e.g., detects) such occurrences and facilitates mapping with only the appropriate EPT address ranges (e.g., either GPA-M of EPT-K or GPA-N of EPT-U, or both). In response to the example context switch handler 250 detecting a context switch request, the example trampoline code manager 252 facilitates (e.g., implements available trampoline code that may have been compiled into the guest kernel) a trampoline code request (to the example address space isolator 108 of the example hypervisor 104) invoked by the guest kernel of the requesting VM. Example trampoline code is shown below in Table 1.

TABLE 1

| Sequence | Pseudocode |
| --- | --- |
| 1 | Trampoline_to_EPT_K |
| 2 | SAVE_RAX_RCX |
| 3 | movq $0, %rax |
| 4 | movq $0, rcx |
| 5 | vmfunc |
| 6 | RESTORE_RAX_RCX |

In the illustrated example of Table 1, the requesting VM (e.g., $VM_1$ 106A) of the example platform 100 generates and/or otherwise invokes the trampoline code of Table 1. While the example trampoline code of Table 1 is unique to a particular Intel® processor to apply appropriate configuration settings (e.g., to VMCS) that facilitate EPT focus, examples disclosed herein are not limited thereto and alternate trampoline code may be called depending on uniqueness or nuances of particular processors (e.g., alternate instructions, register nomenclature, etc.). In the illustrated example of Table 1, the %rax register and the %rcx register contain an index for vmfunc and an EPTP candidate index (e.g., 0 in the example %rcx register refers to an EPT-K focus). While the above example pseudocode of Table 1 indicates an example of context switching to EPT-K, similar pseudocode may be applied with alternate register settings for context switching to EPT-U.

Based on the particular EPT focus detected by the trampoline code manager 252, the example EPT focus adjustor 254 switches the focus to EPT-K or EPT-U. For example, in circumstances in which the focus is EPT-U, the example EPT focus adjustor 254 isolates and/or otherwise restricts mappings to GPA-N only (e.g., GPA range from zero (0) to $2^w$). However, in circumstances in which the focus is EPT-K, the example EPT focus adjustor 254 operates in conjunction with the guest page table to share and/or otherwise permit/offer mappings for the user mode GVA into GPA-N and/or for the kernel mode GVA into GPA-M (e.g., GPA range from zero (0) to $2^w$, GPA range from $2^w$ to $2^{w+1}$, GPA range from zero (0) to $2^{w+1}$). When the handling of a system call, an interrupt occurrence, or an exception occurrence is complete, the trampoline code (e.g., similar to the example trampoline code of Table 1) switches the EPT back to EPT-U. In particular, the example vmfunc call and corresponding registers permit the context switch without any need for a VMExit operation(s).

While an example manner of implementing the address space isolator 108 of FIG. 2A and the example context switch engine 120 of FIG. 2B are illustrated in FIGS. 1, 2A, 2B and 3, one or more of the elements, processes and/or devices illustrated in FIG. 1, 2A, 2B and/or 3 may be combined, divided, re-arranged, omitted, eliminated and/or implemented in any other way. Further, the example VM initializer 202, the example spawn detector 208, the example address width adjustor 210, the example memory mirror manager 212, the example EPT generator 214, the example EPT populator 206, the example violation handler 220, the example address analyzer 222, the example mapping engine 224, the example context switch handler 250, the example trampoline code manager 252, the example EPT focus adjustor 254, the example mirror capability discoverer 260, the example mirror utilization informer 262, the example kernel mode page table manager 264 and/or, more generally, the example address space isolator 108 and the example context switch engine 120 of FIGS. 1 and 2A and/or 2B may be implemented by hardware, software, firmware and/or any combination of hardware, software and/or firmware. Thus, for example, any of the example VM initializer 202, the example spawn detector 208, the example address width adjustor 210, the example memory mirror manager 212, the example EPT generator 214, the example EPT populator 206, the example violation handler 220, the example address analyzer 222, the example mapping engine 224, the example context switch handler 250, the example trampoline code manager 252, the example EPT focus adjustor 254, the example mirror capability discoverer 260, the example mirror utilization informer 262, the example kernel mode page table manager 264 and/or, more generally, the example address space isolator 108 and the example context switch engine 120 of FIGS. 1 and 2A and/or 2B could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example VM initializer 202, the example spawn detector 208, the example address width adjustor 210, the example memory mirror manager 212, the example EPT generator 214, the example EPT populator 206, the example violation handler 220, the example address analyzer 222, the example mapping engine 224, the example context switch handler 250, the example trampoline code manager 252, the example EPT focus adjustor 254, the example mirror capability discoverer 260, the example mirror utilization informer 262, the example kernel mode page table manager 264 and/or, more generally, the example address space isolator 108 and the example context switch engine 120 of FIGS. 1 and 2A and/or 2B is/are hereby expressly defined to include a non-transitory computer readable storage device or storage disk such as a memory, a digital versatile disk (DVD), a compact disk (CD), a Blu-ray disk, etc. including the software and/or firmware. Further still, the example address space isolator 108 of FIGS. 1, 2A and/or 2B may include one or more elements, processes and/or devices in addition to, or instead of, those illustrated in FIGS. 1, 2A and 2B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the address space isolator 108 of FIGS. 1, 2A and/or 2B are shown in FIGS. 4-6, 7A and 7B. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-6, 7A and 7B, many other methods of implementing the example address space isolator 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4-6, 7A and 7B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
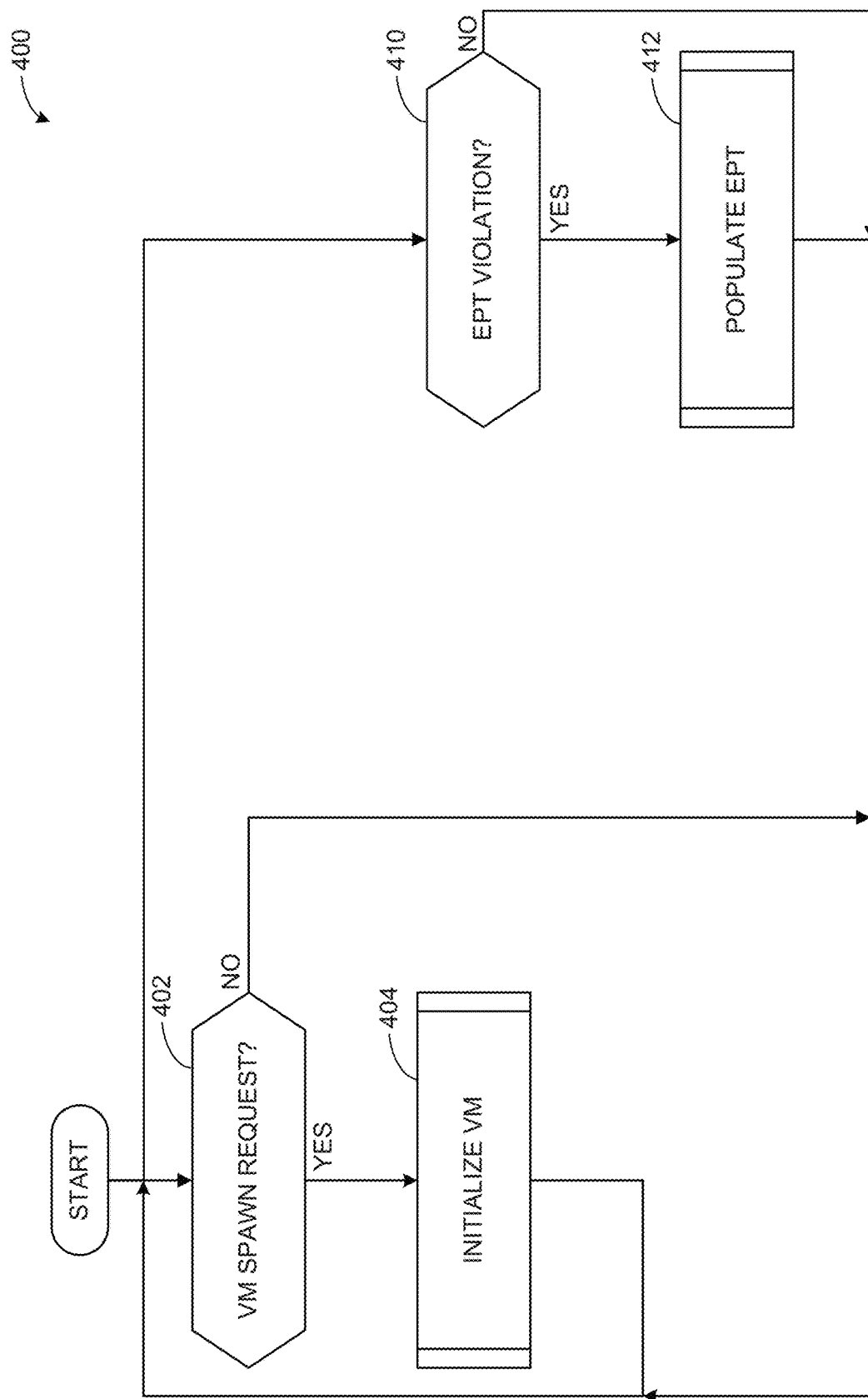

The program 400 of FIG. 4 includes block 402, in which the example spawn detector 208 determines if a VM spawn request has occurred. If so, the example VM initializer 202 initializes the VM (block 404), as described above and in further detail below. However, activities associated with monitoring for spawn occurrences may occur in parallel with activities by the example violation handler 220 to determine whether an EPT violation has occurred (block 410). If so, then the example EPT populator 206 populates corresponding EPTs (block 412), as described above and in further detail below. In other words, the example spawn detector 208 and the example violation handler 220 are not mutually exclusive in their monitoring efforts. In fact, the EPT can be populated during runtime when a violation occurs, or in some examples it can be pre-populated when the VM is spawned.

Figure 5:
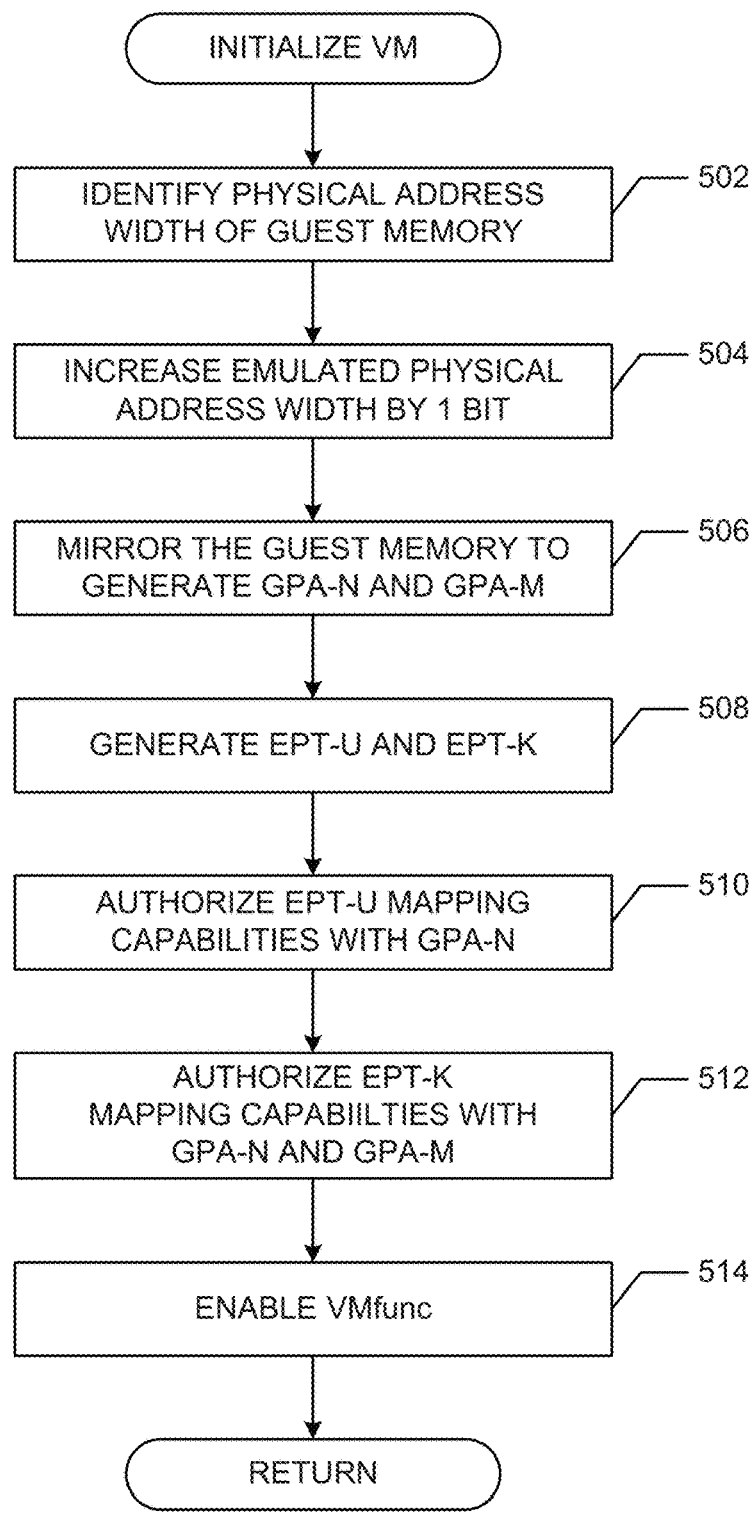

FIG. 5 illustrates additional detail associated with initializing a VM (block 404) by the example VM initializer 202. In the illustrated example of FIG. 5, the example address width adjustor 210 identifies a physical address width of guest memory (block 502). The example address width adjustor 210 also increases an emulated physical address width previously identified by one bit (block 504). The example memory mirror manager 212 mirrors the guest memory to generate two separate address ranges; a first "normal" address range GPA-N and a second "mirrored" address range GPA-M (block 506).

The example EPT generator 214 generates and/or otherwise creates root paging structures, such as EPT-U and EPT-K (block 508), and authorizes EPT-U mapping capabilities in a manner constrained to GPA-N only (block 510). However, because EPT-K is afforded a relatively higher privilege than EPT-U, the example EPT generator 214 authorizes EPT-K mapping capabilities to both GPA-N and GPA-M ranges (block 512). Typically, activities related to populating such paging structures occurs by way of the example mapping engine 224. The example VM initializer 202 exposes a capability of a virtualization instruction (block 514) when the underlying EPT structure has been generated and corresponding GPA ranges have been authorized. Control then returns to block 402 of FIG. 4.

FIG. 6 illustrates additional detail associated with populating the EPT (block 412). In the illustrated example of FIG. 6, the example address analyzer 222 determines whether an address is associated with GPA-N (block 602). If so, the example mapping engine 224 allocates a page (block 604) and maps the page in EPT-U and EPT-K (block 606). In other words, an address within GPA-N can be accessed by the guest kernel, as well. Because this address may also be accessed in the future by the kernel mode, the example mapping engine 224 clones the mapping ("buddy") with an offset in EPT-K (block 608), in which the offset is based on the mirrored address range. If the address is in the trampoline code (block 610), then the example hypervisor commits a VM Resume instruction and control returns to the VM. However, if the address is not in the trampoline code (block 610), then the example EPT populator 206 clears an executable flag in EPT-K (block 612). Control then returns to the VM.

However, in the event the address is not within a range associated with GPA-N (block 602), which is indicative of the kernel mode, then the example mapping engine 224 searches EPT-K for a mapping of a buddy (e.g., an offset address) (block 614). If the example mapping engine 224 finds it (block 616), then this is indicative of an address that should be accessible by both user mode and kernel mode that will ultimately map to the same physical address (e.g., PA 320). The example mapping engine 224 creates a mapping of the address based on the buddy (block 618).

On the other hand, if the search in EPT-K by the example mapping engine 224 does not find a corresponding buddy (block 616), then this is indicative of a kernel address that is only to be mapped in EPT-K, but has no user mode counterpart in EPT-U. As such, the example mapping engine 224 allocates a corresponding page (block 620) and maps the address in EPT-K (block 622), such as the address (B) 356 of FIG. 3 that is mapped to EPT-K 314 corresponding to physical address (PB) 322. Control then returns to the VM.

Figure 7B:
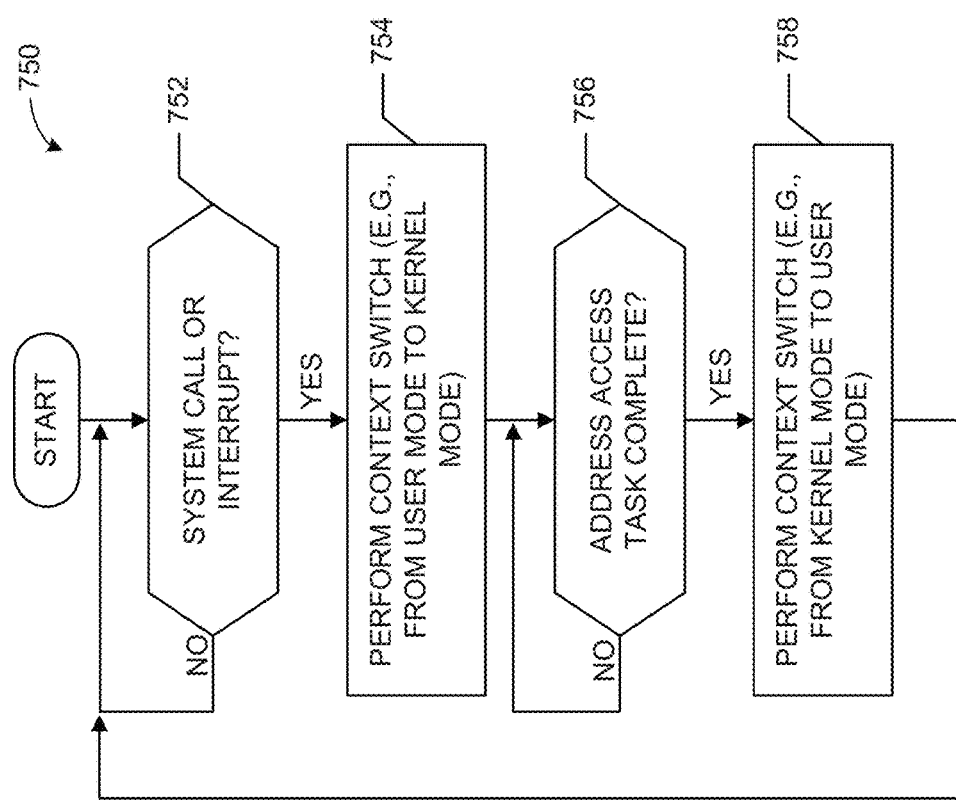
Figure 7A:
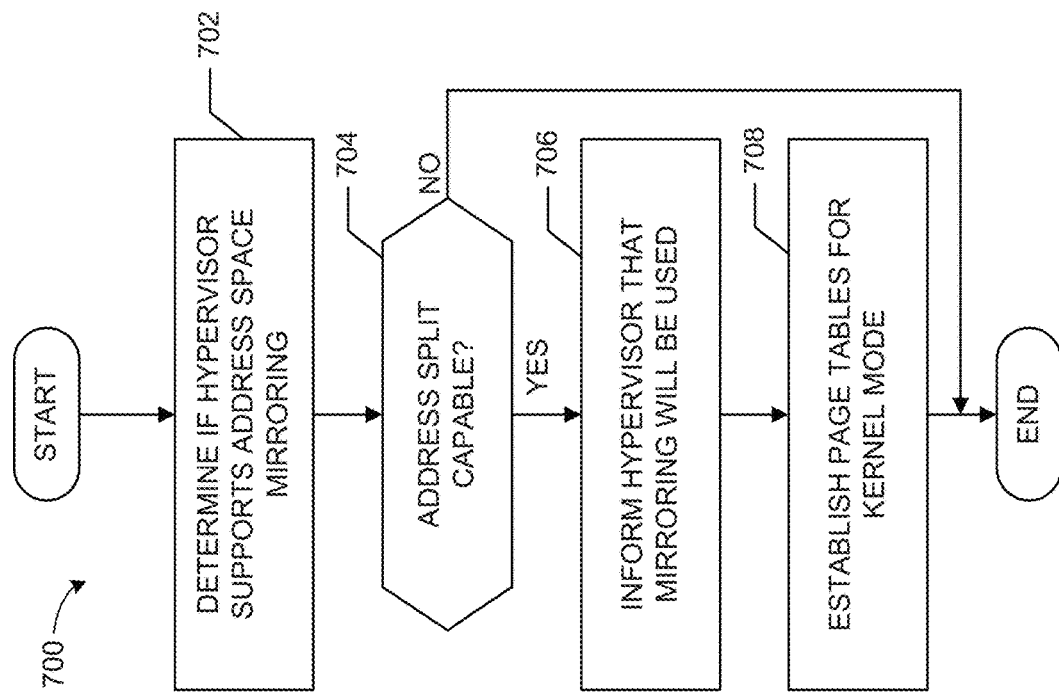

FIGS. 7A and 7B are programs corresponding to operation of a VM spawned by the example hypervisor 104. In particular, FIG. 7A is a program 700 corresponding to example VM operation(s) after the VM is initially instantiated, and FIG. 7B is a program 750 corresponding to example VM operation(s) during runtime (e.g., in response to interrupts inside the VM).

The program 700 of FIG. 7A includes block 702, in which the example mirror capability discoverer 260 determines if the example hypervisor 104 supports address space mirroring. As described above, such determinations may be accomplished by way of an MSR or CPUid call by the kernel of the recently instantiated VM. The example mirror utilization informer 262 determines whether the hypervisor 104 is address split capable and/or whether the hypervisor 104 supports a VMfunc instruction to accomplish address splitting (block 704). If not, then the example program 700 of FIG. 7A ends and the VM and corresponding hypervisor 104 operate in a traditional/normal manner. However, in the event the example mirror utilization informer 262 receives and/or otherwise retrieves a response from the MSR or CPUid call indicative of address mirroring capabilities (block 704), then the example mirror utilization informer 262 sends, informs and/or otherwise transmits an indication to the hypervisor 104 that the VM will use address mirroring (block 706). The example kernel mode page table manager 264 then establishes page tables for kernel virtual addresses into GPA-M in the example VM (block 708) before the example program 700 of FIG. 7A ends. In the event the address mirroring capability is not detected (block 704), then the kernel mode page table functions as usual and establishes page tables for kernel virtual addresses and user virtual addresses into GPA-N.

The program 750 of FIG. 7B includes block 752, in which the example context switch handler 250 responds to a system call or interrupt of the example VM. In particular, a VM operating in user mode will switch to kernel mode in response to a system call or interrupt occurrence. In such circumstances, address mirroring is to be used during a context switch. The example trampoline code manager 252 initiates the context switch by identifying and sending appropriate trampoline code that includes the example VMfunc (block 754) instruction, as shown above in the illustrated example of Table 1. The example EPT focus adjustor 254 causes the VM kernel to utilize mirrored addressing having a proper focus on GPA-M addresses (mirrored addresses) during the kernel mode. In some examples, the EPT focus adjustor 254 invokes a first type of EPT (e.g., EPT-U) in response to a user mode context switch, and in other examples the EPT focus adjustor 254 invokes a second type of EPT (e.g., EPT-K) in response to a kernel mode context switch. In some examples, the EPT focus adjustor 254 isolates mappings of the first type of EPT using a first GPA range (e.g., $2^w$) that is authorized for the first type of EPT (e.g., GPA-N). In still other examples, the EPT focus adjustor 254 isolates mappings of the second type of EPT using a second GPA range (e.g., $2^{w+1}$) that is authorized for the second type of EPT (e.g., GPA-M). When the example EPT focus adjustor 254 determines that a system call, an interrupt or an exception (block 756), then the example trampoline code manager 252 performs a context switch from kernel mode to user mode (block 758) (e.g., using trampoline code in a manner similar to example Table 1. Control then returns to block 752, in which the example context switch handler 250 continues to respond to (e.g., monitor for) instances of system calls, exceptions and/or interrupts.

Figure 8:
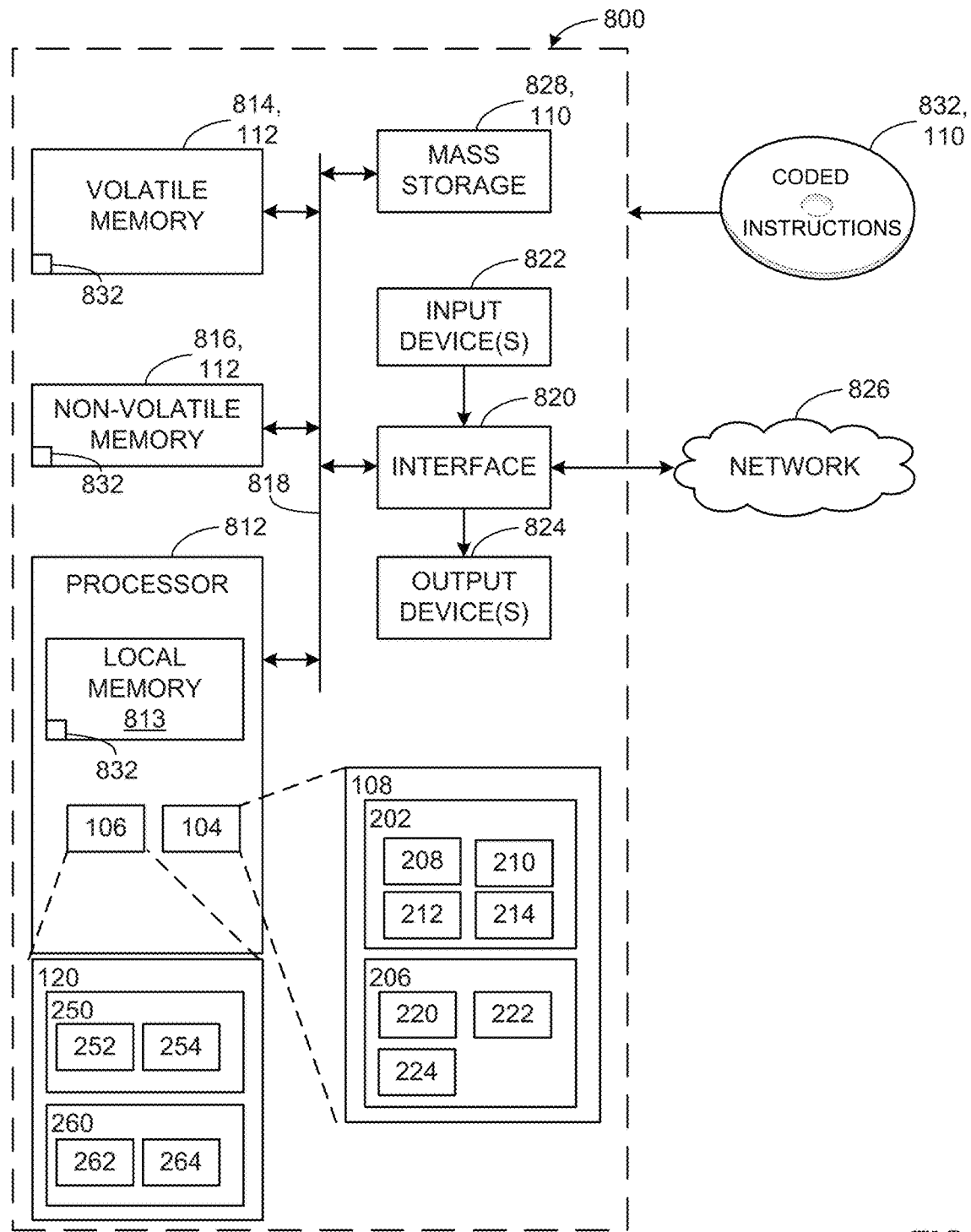
FIG. 8 is a block diagram of an example processing platform structured to execute the instructions of FIGS. 4-6, 7A and 7B to implement the example mapping of FIG. 3, the example address space isolator of FIGS. 1 and/or 2A, and/or the example context switch engine of FIGS. 1 and/or 2B.

FIG. 8 is a block diagram of an example processor platform 800 structured to execute the instructions of FIGS. 4-7 to implement the address space isolator 108 of FIGS. 1, 2A, 2B and 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example VM initializer 202, the example spawn detector 208, the example address width adjustor 210, the example memory mirror manager 212, the example EPT generator 214, the example context switch handler 250, the example trampoline code manager 252, the example EPT focus adjustor 254, the example EPT populator 206, the example violation handler 220, the example address analyzer 222, the example mapping engine 224, the example mirror capability discoverer 260, the example mirror utilization informer 262, the example kernel mode page table manager 264 and/or, more generally, the example address space isolator 108 and the example context switch engine 120.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that maintain a separation between user space and kernel space on computing platforms in a manner that avoids memory allocation of duplicated page tables. Additionally, examples disclosed herein permit context switching between EPTs without requiring page table tracking, unlike traditional EPTI techniques. Disclosed methods, apparatus and articles of manufacture improve the efficiency of using a computing device by avoiding such memory allocation duplication that is required for every instantiated process when using traditional memory separation techniques (e.g., KPTI). Disclosed methods, apparatus, systems and articles of manufacture are accordingly directed to one or more improvement(s) in the functioning of a computer.

Example methods, apparatus, systems, and articles of manufacture to control address space isolation in a virtual machine are disclosed herein. Further examples and combinations thereof include the following:

Example 1 includes an apparatus to authorize extended page table (EPT) mapping, the apparatus comprising an address width adjustor to identify a memory width value corresponding to a guest memory associated with a virtual machine (VM), and generate an expanded emulated memory width value, a memory mirror manager to generate a first guest physical address (GPA) range based on the memory width value, and generate a second GPA range based on the expanded emulated memory width value, and an EPT generator to generate root paging structures of a first type of EPT with respective addresses within the first GPA range, and generate root paging structures of a second type of EPT with respective addresses within (a) the first GPA range and (b) the second GPA range.

Example 2 includes the apparatus as defined in example 1, wherein the address width adjustor is to generate the expanded emulated memory width value in response to an instantiation request.

Example 3 includes the apparatus as defined in example 1, wherein the address width adjustor is to increment the memory width value by one bit to generate the expanded emulated memory width value.

Example 4 includes the apparatus as defined in example 1, wherein the memory mirror manager is to set the first GPA range between zero and the memory width value.

Example 5 includes the apparatus as defined in example 1, wherein the memory mirror manager is to set the second GPA range between the memory width value and the expanded emulated memory width value.

Example 7 includes the apparatus as defined in example 1, further including a context switch handler to identify at least one of a system call or an interrupt, the at least one of the system call or the interrupt indicative of a context switch of the VM.

Example 8 includes the apparatus as defined in example 7, further including a trampoline code manager to invoke code based on address mirroring capabilities.

Example 9 includes the apparatus as defined in example 7, further including an EPT focus adjustor to invoke the first type of EPT in response to a user mode context switch.

Example 10 includes the apparatus as defined in example 9, wherein the EPT focus adjustor is to isolate mappings to the first type of EPT using the first GPA range.

Example 11 includes the apparatus as defined in example 7, further including an EPT focus adjustor to invoke the second type of EPT in response to a kernel mode context switch.

Example 12 includes the apparatus as defined in example 11, wherein the EPT focus adjustor is to permit mappings to the second type of EPT using the first and the second GPA ranges.

Example 13 includes a non-transitory machine readable medium comprising instructions that, when executed, cause at least one processor to at least identify a memory width value corresponding to a guest memory associated with a virtual machine (VM), generate an expanded emulated memory width value, generate a first guest physical address (GPA) range based on the memory width value, generate a second GPA range based on the expanded emulated memory width value, generate root paging structures of a first type of EPT with respective addresses within the first GPA range, and generate root paging structures of a second type of EPT with respective addresses within (a) the first GPA range and (b) the second GPA range.

Example 14 includes the non-transitory machine readable medium as defined in example 13, wherein the instructions, when executed, cause the at least one processor to generate the expanded emulated memory width value in response to an instantiation request.

Example 15 includes the non-transitory machine readable medium as defined in example 13, wherein the instructions, when executed, cause the at least one processor to increment the memory width value by one bit to generate the expanded emulated memory width value.

Example 16 includes the non-transitory machine readable medium as defined in example 13, wherein the instructions, when executed, cause the at least one processor to set the first GPA range between zero and the memory width value.

Example 17 includes the non-transitory machine readable medium as defined in example 13, wherein the instructions, when executed, cause the at least one processor to set the second GPA range between the memory width value and the expanded emulated memory width value.

Example 18 includes the non-transitory machine readable medium as defined in example 13, wherein the instructions, when executed, cause the at least one processor to identify at least one of a system call or an interrupt, the at least one of the system call or the interrupt indicative of a context switch of the VM.

Example 19 includes the non-transitory machine readable medium as defined in example 18, wherein the instructions, when executed, cause the at least one processor to invoke code based on address mirroring capabilities.

Example 20 includes the non-transitory machine readable medium as defined in example 18, wherein the instructions, when executed, cause the at least one processor to invoke the first type of EPT in response to a user mode context switch.

Example 21 includes the non-transitory machine readable medium as defined in example 20, wherein the instructions, when executed, cause the at least one processor to isolate mappings to the first type of EPT using the first GPA range.

Example 22 includes the non-transitory machine readable medium as defined in example 18, wherein the instructions, when executed, cause the at least one processor to invoke the second type of EPT in response to a kernel mode context switch.

Example 23 includes the non-transitory machine readable medium as defined in example 22, wherein the instructions, when executed, cause the at least one processor to permit mappings to the second type of EPT using the first and the second GPA ranges.

Example 24 includes a system to authorize extended page table (EPT) mapping, the system comprising means for address width adjusting to identify a memory width value corresponding to a guest memory associated with a virtual machine (VM), and generate an expanded emulated memory width value, means for memory mirroring to generate a first guest physical address (GPA) range based on the memory width value, and generate a second GPA range based on the expanded emulated memory width value, and means for EPT generation to generate root paging structures of a first type of EPT with respective addresses within the first GPA range, and generate root paging structures of a second type of EPT with respective addresses within (a) the first GPA range and (b) the second GPA range.

Example 25 includes the system as defined in example 24, wherein the address width adjusting means is to generate the expanded emulated memory width value in response to an instantiation request.

Example 26 includes the system as defined in example 24, wherein the address width adjusting means is to increment the memory width value by one bit to generate the expanded emulated memory width value.

Example 27 includes the system as defined in example 24, wherein the address width adjusting means is to set the first GPA range between zero and the memory width value.

Example 28 includes the system as defined in example 24, wherein the address width adjusting means is to set the second GPA range between the memory width value and the expanded emulated memory width value.

Example 29 includes the system as defined in example 24, further including means for context switching to identify at least one of a system call or an interrupt, the at least one of the system call or the interrupt indicative of a context switch of the VM.

Example 30 includes the system as defined in example 29, further including means for managing trampoline code to invoke code based on address mirroring capabilities.

Example 31 includes the system as defined in example 29, further including means for EPT focus adjusting to invoke the first type of EPT in response to a user mode context switch.

Example 32 includes the system as defined in example 31, wherein the EPT focus adjusting means is to isolate mappings to the first type of EPT using the first GPA range.

Example 33 includes the system as defined in example 29, further including means for EPT focus adjusting to invoke the second type of EPT in response to a kernel mode context switch.

Example 34 includes the system as defined in example 33, wherein the EPT focus adjusting means is to permit mappings to the second type of EPT using the first and the second GPA ranges.

Example 35 includes a method to authorize extended page table (EPT) mapping, the method comprising identifying, by executing an instruction with at least one processor, a memory width value corresponding to a guest memory associated with a virtual machine (VM), generating, by executing an instruction with the at least one processor, an expanded emulated memory width value, generating, by executing an instruction with the at least one processor, a first guest physical address (GPA) range based on the memory width value, generating, by executing an instruction with the at least one processor, a second GPA range based on the expanded emulated memory width value, generating, by executing an instruction with the at least one processor, root paging structures of a first type of EPT with respective addresses within the first GPA range, and generating, by executing an instruction with the at least one processor, root paging structures of a second type of EPT with respective addresses within (a) the first GPA range and (b) the second GPA range.

Example 36 includes the method as defined in example 35, further including generating the expanded emulated memory width value in response to an instantiation request.

Example 37 includes the method as defined in example 35, further including incrementing the memory width value by one bit to generate the expanded emulated memory width value.

Example 38 includes the method as defined in example 35, further including setting the first GPA range between zero and the memory width value.

Example 39 includes the method as defined in example 35, further including setting the second GPA range between the memory width value and the expanded emulated memory width value.

Example 40 includes the method as defined in example 35, further including identifying at least one of a system call or an interrupt, the at least one of the system call or the interrupt indicative of a context switch of the VM.

Example 41 includes the method as defined in example 40, further including invoking code based on address mirroring capabilities.

Example 42 includes the method as defined in example 40, further including invoking the first type of EPT in response to a user mode context switch.

Example 43 includes the method as defined in example 42, further including isolating mappings to the first type of EPT using the first GPA range.

Example 44 includes the method as defined in example 40, further including invoking the second type of EPT in response to a kernel mode context switch.

Example 45 includes the method as defined in example 44, further including permitting mappings to the second type of EPT using the first and the second GPA ranges.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to authorize extended page table (EPT) mapping, the apparatus comprising:
    address width adjusting circuitry to:
        identify a memory width value corresponding to a guest memory associated with a virtual machine (VM); and
        generate an expanded emulated memory width value;
    memory mirror managing circuitry to:
        generate a first guest physical address (GPA) range based on the memory width value; and
        generate a second GPA range based on the expanded emulated memory width value; and
    EPT generating circuitry to:
        generate root paging structures of a first type of EPT with respective addresses within the first GPA range; and
        generate root paging structures of a second type of EPT with respective addresses within (a) the first GPA range and (b) the second GPA range.

2. The apparatus as defined in claim 1, wherein the address width adjusting circuitry is to generate the expanded emulated memory width value in response to an instantiation request.

3. The apparatus as defined in claim 1, wherein the address width adjusting circuitry is to increment the memory width value by one bit to generate the expanded emulated memory width value.

4. The apparatus as defined in claim 1, wherein the memory mirror managing circuitry is to set the first GPA range between zero and the memory width value.

5. The apparatus as defined in claim 1, wherein the memory mirror managing circuitry is to set the second GPA range between the memory width value and the expanded emulated memory width value.

6. The apparatus as defined in claim 1, further including context switch handling circuitry to identify at least one of a system call or an interrupt, the at least one of the system call or the interrupt indicative of a context switch of the VM.

7. The apparatus as defined in claim 6, further including trampoline code managing circuitry to invoke code based on address mirroring capabilities.

8. The apparatus as defined in claim 6, further including EPT focus adjusting circuitry to invoke the first type of EPT in response to a user mode context switch.

9. A non-transitory machine readable medium comprising instructions that, when executed, cause at least one processor to at least:
    identify a memory width value corresponding to a guest memory associated with a virtual machine (VM);
    generate an expanded emulated memory width value;
    generate a first guest physical address (GPA) range based on the memory width value;
    generate a second GPA range based on the expanded emulated memory width value;
    generate root paging structures of a first type of EPT with respective addresses within the first GPA range; and
    generate root paging structures of a second type of EPT with respective addresses within (a) the first GPA range and (b) the second GPA range.

10. The non-transitory machine readable medium as defined in claim 9, wherein the instructions, when executed, cause the at least one processor to set the second GPA range between the memory width value and the expanded emulated memory width value.

11. The non-transitory machine readable medium as defined in claim 9, wherein the instructions, when executed, cause the at least one processor to identify at least one of a system call or an interrupt, the at least one of the system call or the interrupt indicative of a context switch of the VM.

12. The non-transitory machine readable medium as defined in claim 11, wherein the instructions, when executed, cause the at least one processor to invoke code based on address mirroring capabilities.

13. The non-transitory machine readable medium as defined in claim 11, wherein the instructions, when executed, cause the at least one processor to invoke the first type of EPT in response to a user mode context switch.

14. The non-transitory machine readable medium as defined in claim 13, wherein the instructions, when executed, cause the at least one processor to isolate mappings to the first type of EPT using the first GPA range.

15. The non-transitory machine readable medium as defined in claim 11, wherein the instructions, when executed, cause the at least one processor to invoke the second type of EPT in response to a kernel mode context switch.

16. The non-transitory machine readable medium as defined in claim 15, wherein the instructions, when executed, cause the at least one processor to permit mappings to the second type of EPT using the first and the second GPA ranges.

17. A system to authorize extended page table (EPT) mapping, the system comprising:
    means for address width adjusting to:
        identify a memory width value corresponding to a guest memory associated with a virtual machine (VM); and
        generate an expanded emulated memory width value;
    means for memory mirroring to:
        generate a first guest physical address (GPA) range based on the memory width value; and
        generate a second GPA range based on the expanded emulated memory width value; and
    means for EPT generation to:
        generate root paging structures of a first type of EPT with respective addresses within the first GPA range; and
        generate root paging structures of a second type of EPT with respective addresses within (a) the first GPA range and (b) the second GPA range.

18. The system as defined in claim 17, wherein the address width adjusting means is to generate the expanded emulated memory width value in response to an instantiation request.

19. The system as defined in claim 17, wherein the address width adjusting means is to set the first GPA range between zero and the memory width value.

20. The system as defined in claim 17, further including means for context switching to identify at least one of a system call or an interrupt, the at least one of the system call or the interrupt indicative of a context switch of the VM.

21. The system as defined in claim 20, further including means for managing trampoline code to invoke code based on address mirroring capabilities.

22. The system as defined in claim 20, further including means for EPT focus adjusting to invoke the first type of EPT in response to a user mode context switch.

23. The system as defined in claim 22, wherein the EPT focus adjusting means is to isolate mappings to the first type of EPT using the first GPA range.

24. The system as defined in claim 20, further including means for EPT focus adjusting to invoke the second type of EPT in response to a kernel mode context switch.

25. The system as defined in claim 24, wherein the EPT focus adjusting means is to permit mappings to the second type of EPT using the first and the second GPA ranges.

\* \* \* \* \*